Figure 1:
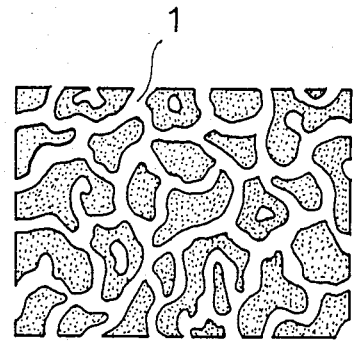

United States Patent [19]

Nakashima et al.

[11] Patent Number: 4,657,875

[45] Date of Patent: Apr. 14, 1987

[54] ARTICLES OF POROUS GLASS AND PROCESS FOR PREPARING THE SAME

[75] Inventors: Tadao Nakashima; Masataka Shimizu; Mikio Kawano, all of Miyazaki, Japan

[73] Assignee: Miyazaki Prefecture, Miyazaki, Japan

[21] Appl. No.: 757,313

[22] Filed: Jul. 22, 1985

[30] Foreign Application Priority Data

Jul. 31, 1984 [JP] Japan .................. 59-162085

[51] Int. Cl.$^4$ .................. C03C 11/00; C03C 17/00
[52] U.S. Cl. .................. 501/39; 501/66; 501/70; 501/72; 65/31; 156/663
[58] Field of Search .................. 501/39, 66, 70, 72; 65/31, 3.15; 156/663

[56] References Cited

U.S. PATENT DOCUMENTS

| | | | |
|---|---|---|---|
| 2,500,092 | 3/1950 | Parker et al. | 65/31 |
| 2,834,738 | 5/1958 | Vincent | 65/31 |
| 3,113,855 | 12/1963 | Elmer | 65/31 |
| 3,149,946 | 9/1964 | Elmer | 65/31 |
| 3,549,524 | 12/1970 | Haller | 65/31 |
| 3,792,987 | 2/1974 | Eaton | 65/31 |
| 3,904,422 | 9/1975 | Eaton | 65/31 |
| 4,042,359 | 8/1977 | Schnabel et al. | 65/31 |
| 4,233,169 | 11/1980 | Beall et al. | 65/31 |

FOREIGN PATENT DOCUMENTS

| | | | |
|---|---|---|---|
| 140334 | 8/1982 | Japan | 501/66 |
| 60-33230 | 2/1985 | Japan | 156/663 |
| 1524260 | 11/1971 | United Kingdom | 501/66 |

OTHER PUBLICATIONS

Kingery et al, "Intro. to Ceramics", pp. 113 to 116.

Primary Examiner—William R. Dixon, Jr.
Assistant Examiner—A. Knab
Attorney, Agent, or Firm—Larson & Taylor

[57] ABSTRACT

Porous glass product of the invention comprises about 60 to about 80% by weight of $SiO_2$, about 7 to about 15% by weight of $Al_2O_3$, about 6 to about 12% by weight of $B_2O_3$, about 3 to about 7% by weight of $Na_2O$ and about 3 to 7% by weight of CaO and having pores about 200 to about 10000 nm in size and circular in cross section.

15 Claims, 6 Drawing Figures (× 3000)

(× 3000)

ARTICLES OF POROUS GLASS AND PROCESS FOR PREPARING THE SAME

This invention relates to articles of porous glass and a process for preparing the same.

Glass of the $Na_2O$-$B_2O_3$-$SiO_2$ type can be separated into a highly siliceous phase and a $Na_2O$-$B_2O_3$ phase. Processes utilizing this phenomenon are known for preparing a porous, highly siliceous glass by treating the phase-separated glass with an acid solution to dissolve out the $Na_2O$-$B_2O_3$ phase (U.S. Pat. Nos. 2,106,744 and 2,215,039). However, since the presence of excess $Al_2O_3$ in the conventional system significantly inhibits the phase separation, the maximum $Al_2O_3$ content in the system is limited up to about 4 to about 5% by weight of the system. Accordingly the starting materials usable in these methods are limited to specific kinds. For example, the methods can not employ an inexpensive glass of volcanic origin which is present in volcanic ash known as "Shirasu" and naturally occurring in southern areas of Kyushu, Japan. Further, the methods involve the problems of giving porous glass, for example, the properties of which are readily affected by the change in the composition of the system due to the base glass having a simple composition and which is poor in chemical durability.

An object of the present invention is to provide a process for preparing articles of porous glass having the $Al_2O_3$ content which is not limited to a narrow range.

Another object of the invention is to provide a process for preparing porous glass products using as a starting material an inexpensive glass material containing a large amount of $Al_2O_3$, such as volcanic glass.

A further object of the invention is to provide articles of porous glass less susceptible to the change in the composition of the starting materials.

A still further object of the invention is to provide porous glass articles or products outstanding in chemical durability.

Other objects and features of the present invention will become more apparent from the following description.

We conducted extensive research to develop porous glass which can contain $Al_2O_3$ in a broader range of amount and found that a $SiO_2$-$Al_2O_3$-$B_2O_3$-$CaO$ system having a specific composition can cause phase separation despite the maximum $Al_2O_3$ content of as high as about 15%. Then we applied for a patent the process for preparing porous glass based on this novel finding (Japanese Unexamined Patent Publication No. 140334/1982). However, it was found later that the foregoing porous glass of $SiO_2$-$Al_2O_3$-$B_2O_3$-$CaO$ type is likely to involve an excessive degree of phase separation which can cause markedly uneven distribution of the components for the glass in a molten state, thereby rendering the glass cloudy and widely irregular in pore size.

Carrying out further research, we successfuly produced a shaped product of porous glass which is not limited in $Al_2O_3$ content to a narrow range and which have pores of easily controllable size, and we completed a process for preparing the same. Based on this novel finding, the present invention has been accomplished.

The present invention provides an article of porous glass comprising about 60 to about 80% by weight of $SiO_2$, about 7 to about 15% by weight of $Al_2O_3$, about 6 to about 12% by weight of $B_2O_3$, about 3 to about 7% by weight of $Na_2O$ and about 3 to about 7% by weight of $CaO$ and having pores of substantially cylindrical shape about 200 to about 10000 nm in pore size and about 0.3 to about 1.2 $cm^3/g$ in pore volume.

The present invention also provides a process for producing a porous glass article or product comprising the steps of heat-treating a shaped body of base glass comprising about 45 to about 70% by weight of $SiO_2$, about 5 to about 15% by weight of $Al_2O_3$, about 8 to about 30% by weight of $B_2O_3$, about 5 to about 10% by weight of $Na_2O$ and about 8 to about 25% by weight of $CaO$ at a constant temperature within the range of about 680° to about 800° C. for about 2 to about 72 hours and leaching out the acid-soluble components by an inorganic acid (hereinafter referred to as "first process").

The present invention further provides a process for producing a porous glass article or product comprising the steps of heat-treating a shaped body of base glass comprising about 45 to about 70% by weight of $SiO_2$, about 5 to about 15% by weight of $Al_2O_3$, about 8 to about 30% by weight of $B_2O_3$, about 5 to about 10% by weight of $Na_2O$, about 4 to about 20% by weight of $CaO$ and about 1.6 to about 12.5% by weight of $MgO$ at a constant temperature within the range of about 680° to about 800° C. for about 2 to about 72 hours and leaching out the acid-soluble components by an inorganic acid (hereinafter referred to as "second process").

The shaped body of base glass as used in the first process comprises about 45 to about 70% by weight of $SiO_2$, about 5 to about 15% by weight of $Al_2O_3$, about 8 to about 30% by weight of $B_2O_3$, about 5 to about 10% by weight of $Na_2O$ and about 8 to about 25% by weight of $CaO$.

Since known $Na_2O$-free base glass gives rise to an excessive degree of phase separation on heat treatment, it is difficult to precisely control the size of the pores formed by acid treatment and consequently glass is produced with pores of widely scattered size. In contrast, the base glass of the foregoing composition containing $Na_2O$ which tends to reduce the rate of phase separation achieves phase separation in a mild degree, thereby facilitating the control of the pore size.

Generally the porous glass articles prepared from base glass of the same composition vary in pore size depending directly on the dimension of separated phase. Accordingly it is very important to determine the heat-treating conditions suitable to obtain a desired pore size in glass product. The following relationships exist concerning the base glass to be used in this invention which has any composition within the above-specified range. When the heat-treating temperature is maintained at a constant level and the heat-treating time is changed, the pore size of the resulting glass article exponentially increases with the progress of heat treatment, as shown below in Equation (1). On the other hand, when the heat-treating time is kept constant and the heat-treating temperature is altered, the pore size of the product increases with the rise of heat-treating temperature, as indicated below in Equation (2).

$$\ln \bar{r} = 0.5 \ln t + a \quad (1)$$

$$\ln \bar{r} = -E/2RT + b \quad (2)$$

wherein
$\bar{r}$ is the mean pore size (Å);
t is the heat-treating time (hr);

T is the heat-treating temperature (K);
R is the gas constant;
E is the activation energy (kcal/mole); and
a and b are the constants depending on the composition of glass.

The conditions suitable for heat-treating the base glass can be determined by utilizing Equation (1) or (2).

The second process employs a shaped body of base glass slightly different in composition from that used in the first process in that the CaO content is changed to about 4 to about 20% by weight and that about 1.6 to about 12.5% by weight of MgO is added. While capable of controlling the pore size, the base glass of such composition can reduce the temperature gradient for the viscosity of the glass approximately at the shaping temperature during the shaping of the base glass, whereby the increase of its viscosity can be prevented during the shaping thereof and consequently the shaping operation is conducted with an improved efficiency.

There is no particular restriction as to the methods for producing shaped bodies of base glass to be used in the first and second processes. The shaped bodies can be produced, for example, by thoroughly mixing the components to provide a desired composition, placing the composition into a crucible or pot, calcining the same at about 1200° C. to melt it on decomposition and further heating the melt to a temperature of about 1300° to about 1400° C. to complete the fusion in about 1 to about 2 hours and molding the resulting melt in the conventional manner into a product of the desired shape such as a hollow pipe, plate, spheric body, etc.

According to the present invention, the shaped body of base glass is heat-treated at a constant temperature of about 680° to about 800° C. for about 2 to about 72 hours. This thermal treatment gives rise to separation of two phases in the glass structure, thereby changing the transparent base glass into that of cloudy or white, opaque color. The deformation of shaped bodies and the adhesion thereof to each other which would occur on heat treatment can be prevented by filling granular calcium carbonate, alumina or boron nitride about 10 to about 200 μm in particle size into the space around the shaped bodies. Of the fillers exemplified above, boron nitrate is an ideal one because it is most inert to glass.

The shaped body of glass thus phase-separated by the heat treatment is immersed in about 1 to about 2N solution of hydrochloric acid, nitric acid or the like at about 50° to about 100° C. for about 2 to about 24 hours to dissolve out the acid-soluble separated phase of calcium borate, giving a shaped body of glass having a porous structure.

Prior to the acid treatment, the shaped body of phase-separated glass can be surface-treated by being immersed in about 1 to about 5% solution of hydrofluoric acid at or below 20° C. for about 3 to about 15 minutes to remove the acid-resistant, $SiO_2$-rich layer from the surface of the shaped body by chemical polishing. The removal of the layer enables more rapid and more uniform acid treatment.

However, the $SiO_2$ distributed in the calcium borate phase may gel by the hydrolysis during the acid treatment, remaining within the pores of the glass. In this case, since the pore volume of the porous glass is reduced by the $SiO_2$ gel to a smaller value than expected from the composition of the base glass and the heat-treating conditions, the $SiO_2$ gel is preferably removed to obtain a shaped body of porous glass having a greater pore volume. For this purpose, the shaped body of porous glass from which the acid-soluble component has been dissolved out is advantageously immersed in about 0.02 to about 0.5N solution of sodium hydroxide at or below 50° C. for about 1 to about 6 hours to extract the $SiO_2$ gel as sodium silicate. This treatment is conducted preferably at or near room temperature. An unduly high concentration of sodium hydroxide or high extracting temperature is likely to impair the skeleton of porous silica.

The articles of porous glass thus obtained by the first and second processes have a great number of pores substantially circular in cross section and having a precisely controlled pore size of about 200 to about 10000 nm and a pore volume of about 0.3 to about 1.2 $cm^3/g$. The porous glass product produced according to the present invention has a composition of about 60 to about 80% by weight of $SiO_2$, about 7 to about 15% by weight of $Al_2O_3$, about 6 to about 12% by weight of $B_2O_3$, about 3 to about 7% by weight of $Na_2O$ and about 3 to about 7% by weight of CaO. More specifically, the composition of the product is determined depending on the composition of the components, heat-treating temperature and time and other conditions. In heat treatment of glass having the same composition, the $SiO_2$ content is lower and the contents of the other components are relatively higher within the above-specified range of composition as the heat treatment involves a higher temperature and a longer time, whereas the lower the heat-treating temperature and the shorter the heat-treating time, the larger the $SiO_2$ content and the relatively smaller the contents of the other components.

The shaped product of porous glass according to the present invention has a pore size controlled in the range of about 200 to about 10000 nm and is composed of inorganic materials excellent in heat resistance, heat insulation, corrosion resistance, durability and the like and superior in mechanical strength to known porous inorganic materials. Table 1 below shows, for comparison, the porosity and compressive strength of typical porous glass of the present invention and porous inorganic materials of the type commonly used.

TABLE 1

| Material | Porosity | Compressive strength (kg/cm$^2$) |
|---|---|---|
| Porous glass of this invention | 0.55 | 2000–3000 |
| Alumina | 0.55 | 300 |
| Zirconia | 0.55 | 650 |
| Sintered body of glass mullite | 0.25 | 2000 |

The mechanical strength of porous bodies is known to depend generally on the porosity thereof and their relationship can be represented by the following equation $$\sigma = \sigma_0 \exp(-bP)$$

wherein $\sigma$ is the rupture strength of the material, P is the porosity, $\sigma_0$ is the rupture strength thereof when P is 0 and b is the constant depending on the kind of the material.

The value b is the constant which represents the dependency of the rupture strength of the material on the porosity. Accordingly, it is desired that the value b be as small as possible in evaluation of the material. Table 2 below shows the b values of the foregoing porous glass of this invention and known porous inorganic materials.

TABLE 2

| Material | b Value |
| --- | --- |
| Porous glass | 0.98 |
| Alumina | 8–9 |
| Zirconia | 7 |
| Thoria | 6.6 |
| $3CaO.SiO_2$ | 2.5–3.7 |
| Hemihydrate gypsum | 3.5 |

Tables 1 and 2 reveal that the articles of porous glass according to the present invention is higher in mechanical strength than the other porous materials and maintains a high mechanical strength despite the great porosity.

Figure 2:
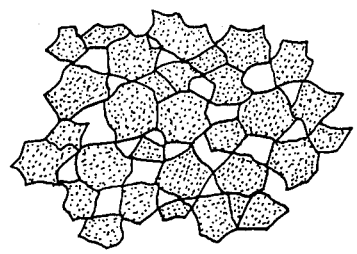

The products of porous glass according to this invention have pores which are found, when measured by a mercury porosimeter, to assume a cylindrical shape as indicated at 1 in FIG. 1. The pores thereof, although not all having a linear cylindrical shape, are substantially identical in size when viewed in cross section. The pores are interconnected to one another in the article to provide a complicated porous structure. Conventional porous bodies of ceramics have voids formed between aggregate particles held together in the body and have pores of a shape resembling ink bottles. FIG. 2 schematically shows the pore of a porous ceramic body usually produced. The pores as shown therein are composed of voids of larger size connected to one another by passages of smaller size, and are known to have sizes varying with the locations of the pore (Industrial Research Association; "Recent Fine Ceramics Techniques," page 136, Oct. 10, 1983).

The porous glass product according to this invention, when used for example as a filter medium, is unlikely to clog up in the pores because of its pores of cylindrical shape having a specific size, and therefore can achieve smooth filtration. In contrast, conventional ceramic filters are prone to plug up the pores due to their ink bottle-like shape and to become unable to function as a filter in a short period of time. With the characteristic as stated above, the porous glass product of this invention can be used as ideal filter media not only capable of selective separation in precision filtration but free of the likelihood to clog up.

It is preferred to use as a component for the base glass a glass of volcanic origin contained in volcanic ash such as Shirasu. The glass of volcanic origin used as $SiO_2$ and $Al_2O_3$ sources can increase the vitrification rate and thus can considerably reduce the production costs. Since nearly all impurities present in the glass of volcanic origin are distributed into the calcium borate phase on heat treatment and dissolved out by an acid, the properties of the porous glass are virtually not affected by the impurities present therein.

The present invention gives the following advantages.

(1) A wide range of starting materials can be used because $Al_2O_3$ content can be significantly increased.

(2) Accordingly by use of inexpensive glass of volcanic origin derived from volcanic ash such as Shirasu, porous glass can be produced at exceedingly lower costs without impairing its properties.

(3) The porous glass of this invention has a high chemical durability due to high $Al_2O_3$ content.

(4) Because a base glass comprising 5 or 6 kinds of components can be used in the present invention, the porous glass is unlikely to be affected by the change in the composition of the starting materials.

(5) The pores of the porous glass can be easily controlled to a specific size.

(6) Since the increase in the viscosity of the system can be inhibited during shaping operation, the operational efficiency can be enhanced.

(7) The porous glass has mechanical strength higher and reduced to a lesser extent by the increase of porosity than conventional porous inorganic materials.

(8) With numerous pores of cylindrical shape and of substantially same size, the porous glass products of the invention are useful, for example, as filter media because of less likelihood to clog up.

The porous glass of this invention is suitably used for the following purposes.

(1) Ultrafiltration

The shaped products of this invention have excellent characteristics as an inorganic ultrafilter: (i) being high in mechnical strength, pressure resistance and heat resistance (safely usable at up to 600° C.), (ii) being capable of continuously functioning with high precision because of the unlikelihood to be swollen by the liquid (solvent) used or to have the porous structure degraded by the pressure and (iii) having outstanding water resistance, chemical resistance and chemical durability.

These features can be utilized to overcome the drawbacks of organic high polymer ultrafilters being frequently used at present in the art. Accordingly the products of this invention are expected to find extensive use in food, chemical and mechnical industries. The present products have been confirmed as useful in selectively separating small amounts of oils (fusel oil) present in alcoholic drinks, removing the dregs from vinegar and treating machining oils for regeneration.

(2) Separation of blood serum

It remains important technological problems in biomedical field to effectively separate the corpuscle cell and blood serum in the blood. The products of the invention can achieve good results in this function owing to the features stated above in (1) among which the high heat resistance and chemical durability are significant particularly in view of the sterilization essentially required for the material used.

(3) Carrier for catalysts or microorganisms.

The products of this invention with the controlled porous structure have a countless number of pores which are useful as those in a carrier for biological catalysts such as enzyme and for nonbiological catalysts variously used for chemical reaction. Usually these catalysts can be made to become supported directly on the porous glass product by physical adsorption or can be held thereto using as the binding site the —SiOH or —BOH present in the surface of the product.

In recent years, the manufacture of substances utilizing useful microorganisms has been actively carried out in the field of biotechnology. In such manufacture, the microorganism must be fixedly mounted on a carrier to make efficient use of the energy and function of the microorganism.

Since the products of this invention can be produced with pores having a controlled size 100 to 1000 times larger than those of conventional porous glasses, the products have the more potential to find use as a carrier for microorganisms. So far our research has revealed that while not useful as a carrier for large microorganisms such as yeasts (5 to 8 $\mu$m), the products are usable as a carrier for minute microorganisms such as methane bacteria (about 1 μm) and *Escherichia coli* (less than 2 to 3 μm).

(4) Diffusing duct or plate.

Since the products of the invention have numerous pores formed therethrough and a controlled specific size, the products can be used with good results in conducting chemical engineering unit operations such as efficient absorption of gaseous substance into liquid. Generally it is considered important in gas absorption to create the smallest possible bubbles which result in increase in the area of contact between the gas and liquid. The products can produce an infinite number of fine bubbles having dimensions of the order of microns to submicrons by their pores of controlled size and thus can satisfactorily serve this purpose.

Further with high mechanical strength, the products will not suffer damage by the pressure of gas introduced and can be put to practical use with excellent results.

More specifically the products of the invention can be used as diffusers, for example, as in aeration for disposal of waste water by activated sludge method and as in increasing the concentration of dissolved oxygen in a fish farm.

This invention will be described below in more detail with reference to the following Examples.

EXAMPLE 1

Natural volcanic ash, i.e. "Shirasu," containing glass of volcanic origin, calcium carbonate, boric acid, soda ash and magnesia are mixed together in such amounts as to provide a mixture comprising 50% $SiO_2$, 13% CaO, 5% MgO, 17% $B_2O_3$, 9.41% $Al_2O_3$ and 5.59% $Na_2O$ as major components. The mixture was melted at 1350° C. to obtain a base glass. After cooling to 1200° C., the melt thus obtained was shaped into a hollow glass tube about 10 mm in size, about 1 mm in thickness and about 500 mm in length by blowing method. Alumina powder of not larger than 200 mesh was uniformly packed inside and outside the hollow glass tube. Three samples of this kind were prepared and each heat-treated for 20 hours in a furnace maintained precisely at 725° C., 740° C. and 755° C., respectively. The hollow glass tube thus heat-treated was surface-treated by being immersed in a 2% solution of hydrofluoric acid at 10° C. for about 10 minutes and was dipped in a 1 N solution of hydrochloric acid at 80° C. for 4 hours to dissolve in the acid the separated phase mainly containing calcium borate and resulting from the heat treatment for removal. The hollow glass tube was then further treated with a 0.5 N solution of sodium hydroxide to eliminate the silica remaining in the pores of glass. The glass was immersed in a 0.5 N solution of hydrochloric acid at room temperature for 30 minutes for neutralization, washed with water and dried, giving a desired hollow tube-like shaped product of porous glass. The other two samples were treated in the same manner as above. Table 3 below shows the chemical composition, pore characteristics and mechanical strength of the three samples. Small amounts of the impurities derived from the volcanic ash were omitted from the composition in the table below.

The characteristics of the pores as shown below in Table 3, i.e., pore size, specific surface area, pore volume and porosity, were measured by obtaining the amount of mercury forced into the pores while increasing the pressure level from atmospheric pressure to 2000 atms. by use of a mercury porosimeter (Model "POROSIMETER 2000" manufactured by Carlo Erba Strumentazione Co., Ltd., Italy).

The compressive strength was measured by cutting the hollow tube-like shaped product of porous glass to a length of 20 mm, polishing the sectional surface of the product thus cut, subjecting the product to a compression load acting axially of the product and dividing the maximum load required for rupturing the product by the area of the sectional surface thereof.

TABLE 3

| Sample No. | 1 | 2 | 3 |
|---|---|---|---|
| Heat-treating temperature | 725° C. | 740° C. | 755° C. |
| Composition (wt %) | | | |
| $SiO_2$ | 69 | 68 | 64 |
| $Al_2O_3$ | 13 | 13 | 12 |
| $B_2O_3$ | 9 | 10 | 11 |
| $Na_2O$ | 5 | 5 | 6 |
| CaO | 3 | 4 | 6 |
| Pore size (nm) | 1200 | 2100 | 2500 |
| Specific surface area ($m^2/g$) | 1.74 | 0.92 | 0.74 |
| Pore volume ($cm^3/g$) | 0.523 | 0.484 | 0.464 |
| Porosity | 0.57 | 0.55 | 0.54 |
| Compressive strength ($kg/cm^2$) | 1028 ± 100 | 1463 ± 163 | 1432 ± 155 |

Figure 3:
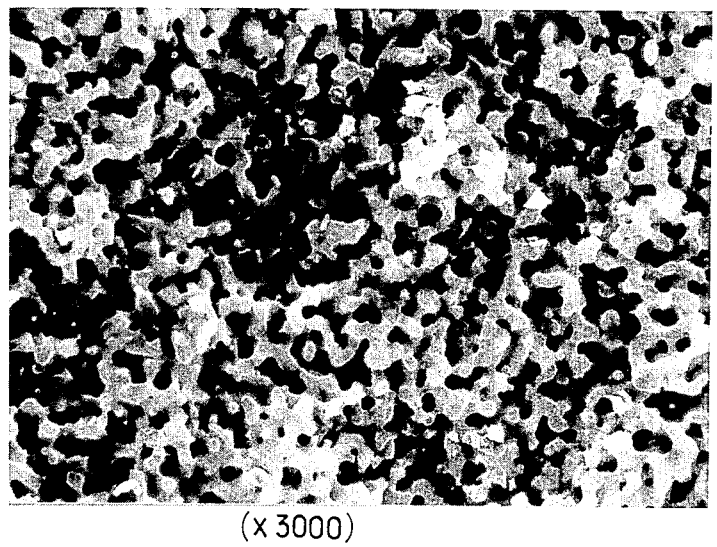
Figure 4:
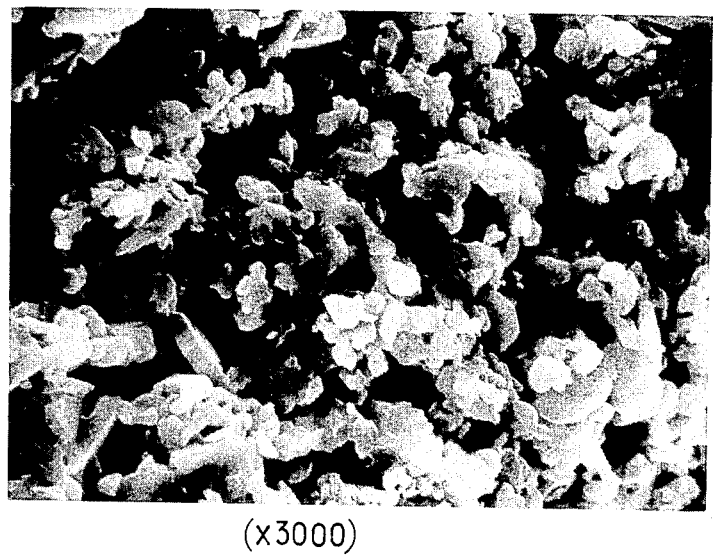
Figure 5:
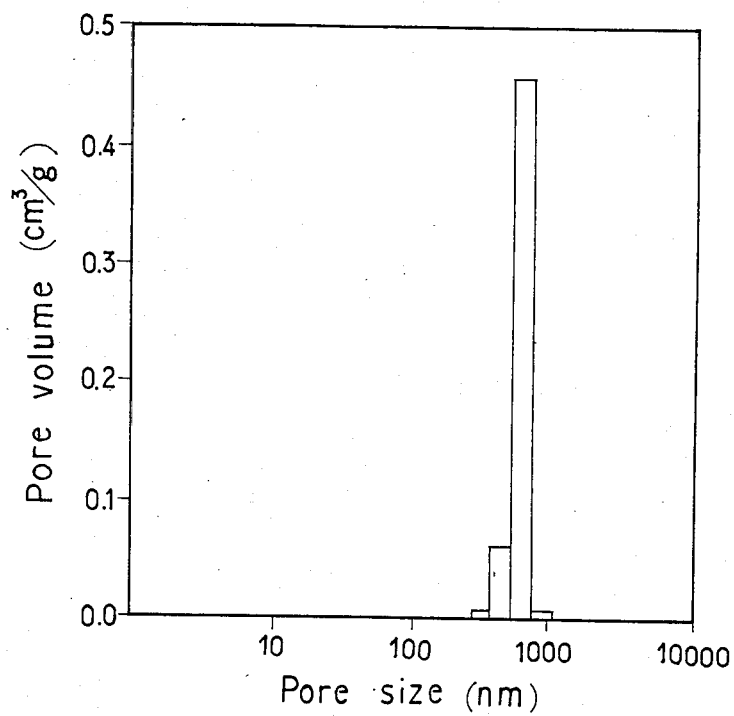
Figure 6:
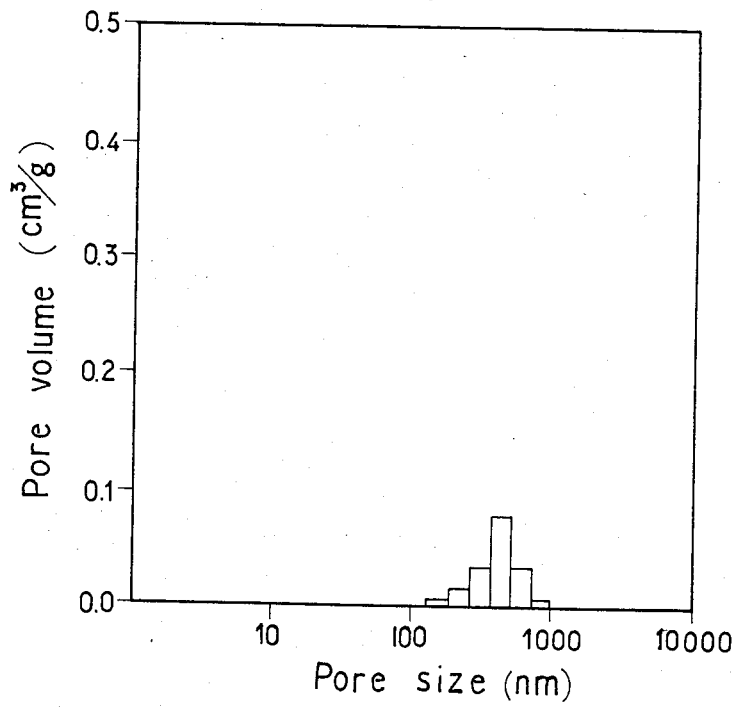

FIG. 3 is an electron micrograph showing the shaped product of porous glass (Sample No. 1) and FIG. 5 is a graph indicating its pore distribution. FIG. 4 is an electron micrograph showing porous alumina ceramic for comparison and FIG. 6 is a graph indicating its pore distribution. FIGS. 3 to 6 reveal that the shaped products of porous glass according to this invention have a countless number of pores superior in size regularity to porous alumina ceramic and precisely controlled to a specific size.

EXAMPLE 2

In the same manner as in Example 1, a shaped product of base glass was prepared, heat-treated at 725° C. for 20 hours and immersed in a 2% solution of hydrofluoric acid at 10° C. for about 10 minutes and then in a 1 N solution of hydrochloric acid at 80° C. for about 4 hours to remove the acid-soluble component. The shaped product of porous glass thus obtained was found to have a pore volume of 0.350 $cm^3/g$.

EXAMPLE 3

A hollow tube-like shaped product of base glass was prepared in the same manner as in Example 1 with the exception of using as the main components for the base glass 50% $SiO_2$, 18% CaO, 17% $B_2O_3$, 9.41% $Al_2O_3$ and 5.59% $Na_2O_3$, and was treated in the same manner as in Example 1 to give a hollow tube-like shaped product of porous glass.

Substantially the same results as in Example 1 were obtained although a little difficulty was encountered in producing a hollow glass tube because of the increased viscosity of glass during the shaping operation.

COMPARISON EXAMPLE 1

A composition comprising the same components as used in Example 1 with the exception of excluding $Na_2O$ was melted at 1300° C., placed onto a stainless steel plate and air-quenched to obtain a glass plate.

The glass plate thus prepared was a white and opaque one with the components unevenly distributed due to an excessive degree of phase separation caused.

EXAMPLE 4

Beads of the base glass prepared in the same manner as in Example 1 and passed through a 14 to 20 mesh screen (1.19 to 0.84 mm in size) were heat-treated together with alumina powder at 700° C. for 20 hours. The beads were immersed in a 1 N solution of HCl at 80° C. for 6 hours to dissolve out the acid-soluble separated phase, thereby giving porous glass beads.

When the beads heat-treated were immersed in 2 volume % of hydrofluoric acid at 10° C. for 8 minutes prior to the immersion in HCl, the time for immersion in HCl was cut short to up to 4 hours.

Observation of the beads under an electron microscope showed that an $SiO_2$-rich, smooth, acid resistant film was formed on the surface of beads heat-treated but not treated with hydrofluoric acid. The film presumably hindered the dissolution of separated phase in HCl, thereby prolonging the time for treatment therewith.

On the other hand, no acid resistant film existed on the surface of beads heat-treated and treated with hydrofluoric acid while a infinite number of pores were clearly observed on the surface thereof.

We claim:

1. An article of porous glass consisting essentially of about 63 to about 70% by weight of $SiO_2$, about 10 to about 14% by weight of $Al_2O_3$, about 8 to about 12% by weight of $B_2O_3$, about 4 to about 6% by weight of $Na_2O$ and about 3 to about 6% by weight of CaO.

2. A process for preparing an article of porous glass, the process comprising the steps of heat-treating a shaped body of base glass consisting essentially of about 48 to about 52% by weight of $SiO_2$, about 8 to about 12% by weight of $Al_2O_3$, about 14 to about 18% by weight of $B_2O_3$, about 5 to about 7% by weight of $Na_2O$ and about 15 to about 18% by weight of CaO at a constant temperature of about 680° to about 800° C. for about 2 to about 72 hours, and dissolving out the acid-soluble component with an inorganic acid.

3. A process for preparing an article of porous glass, the process comprising the steps of heat-treating a shaped body of base glass consisting essentially of about 48 to about 52% by weight of $SiO_2$, about 8 to about 12% by weight of $Al_2O_3$, about 14 to about 18% by weight of $B_2O_3$, about 5 to about 7% by weight of $Na_2O$, about 7 to about 14% by weight of CaO and about 3 to about 10% by weight of MgO at a constant temperature of about 680° to about 800° C. for about 2 to about 72 hours, and dissolving out the acid-soluble component with an inorganic acid.

4. A process as defined in claim 2 in which the shaped product of base glass is heat-treated at about 690° to about 780° C. for about 2 to about 40 hours.

5. A process as defined in claim 2 in which the inorganic acid is hydrochloric acid and/or nitric acid.

6. A process as defined in claim 2 in which the inorganic acid is in the form of about 1 to about 2 N solution.

7. A process as defined in claim 2 in which the shaped body of glass heat-treated is immersed in an inorganic acid at about 50° to about 100° C. for about 2 to about 24 hours.

8. A process as defined in claim 2 in which prior to acid treatment, the shaped body of glass heat-treated is immersed in about 1 to about 5% solution of hydrofluoric acid at or below 20° C. for about 3 to about 15 minutes.

9. A process as defined in claim 2 in which the shaped body of porous glass treated with the acid is immersed in about 0.02 to about 0.5 N aqueous solution of sodium hydroxide at or below 50° C. for about 1 to about 6 hours.

10. A process as defined in claim 3 in which the shaped product of base glass is heat-treated at about 690° to about 780° C. for about 2 to about 40 hours.

11. A process as defined in claim 3 in which the inorganic acid is hydrochloric acid and/or nitric acid.

12. A process as defined in claim 3 in which the inorganic acid is in the form of about 1 to about 2 N solution.

13. A process as defined in claim 3 in which the shaped body of glass heat-treated is immersed in an inorganic acid at about 50° to about 100° C. for about 2 to about 24 hours.

14. A process as defined in claim 3 in which prior to acid treatment, the shaped body of glass heat-treated is immersed in about 1 to about 5% solution of hydrofluoric acid at or below 20° C. for about 3 to about 15 minutes.

15. A process as defined in claim 3 in which the shaped body of porous glass treated with the acid is immersed in about 0.02 to about 0.5 N aqueous solution of sodium hydroxide at or below 50° C. for about 1 to about 6 hours.

* * * * *